No. 747,897. PATENTED DEC. 22, 1903.
J. C. SPANGLER.
ROTATABLE GRAIN DISTRIBUTER FOR ELEVATORS.
APPLICATION FILED APR. 6, 1903.
NO MODEL. 4 SHEETS—SHEET 3.

No. 747,897. PATENTED DEC. 22, 1903.
J. C. SPANGLER.
ROTATABLE GRAIN DISTRIBUTER FOR ELEVATORS.
APPLICATION FILED APR. 6, 1903.
NO MODEL.
4 SHEETS—SHEET 4.
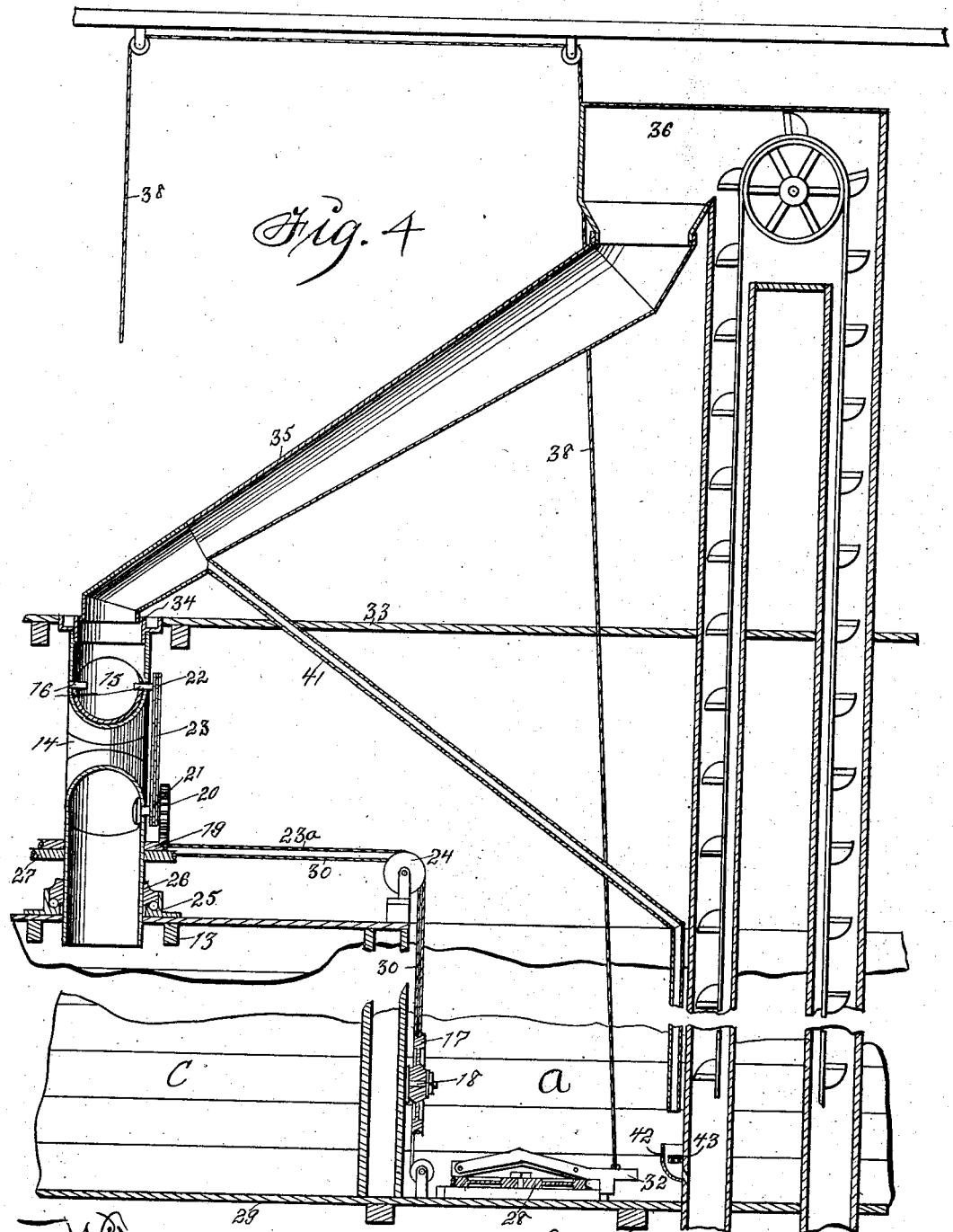

No. 747,897.                                    Patented December 22, 1903.

UNITED STATES PATENT OFFICE.

JOHN C. SPANGLER, OF GOWRIE, IOWA.

ROTATABLE GRAIN-DISTRIBUTER FOR ELEVATORS.

SPECIFICATION forming part of Letters Patent No. 747,897, dated December 22, 1903.

Application filed April 6, 1903. Serial No. 151,395. (No model.)

*To all whom it may concern:*

Be it known that I, JOHN C. SPANGLER, a citizen of the United States, residing at Gowrie, in the county of Webster and State of Iowa, have invented a new and useful Rotatable Grain-Distributer for Elevators, of which the following is a specification.

My object is, first, to avoid the labor and expense incident to distributing grain in elevators to a plurality of bins through an equal number of conveyer-pipes; second, to control the connection of a single distributing-pipe with different bins by means of mechanism that can be operated by a person on the ground floor of an elevator; third, to fix a rotatable wheel in position relative to a plurality of bins and a dial in such a manner that the connection of the distributing-pipe with any one bin will be indicated by means of the dial; fourth, to utilize the single distributing-pipe for conveying grain from a plurality of bins to a central discharge-spout; fifth, to provide automatic signal mechanism to indicate when there is an overflow of grain from the distributing-pipe and also to return the surplus grain to the bulk from which it was carried up by the elevator-cups.

My invention consists in the construction of elements and subcombinations and the arrangement and combination of operative parts, as hereinafter set forth, pointed out in my claims, and illustrated in the accompanying drawings, in which—

Figure 1:
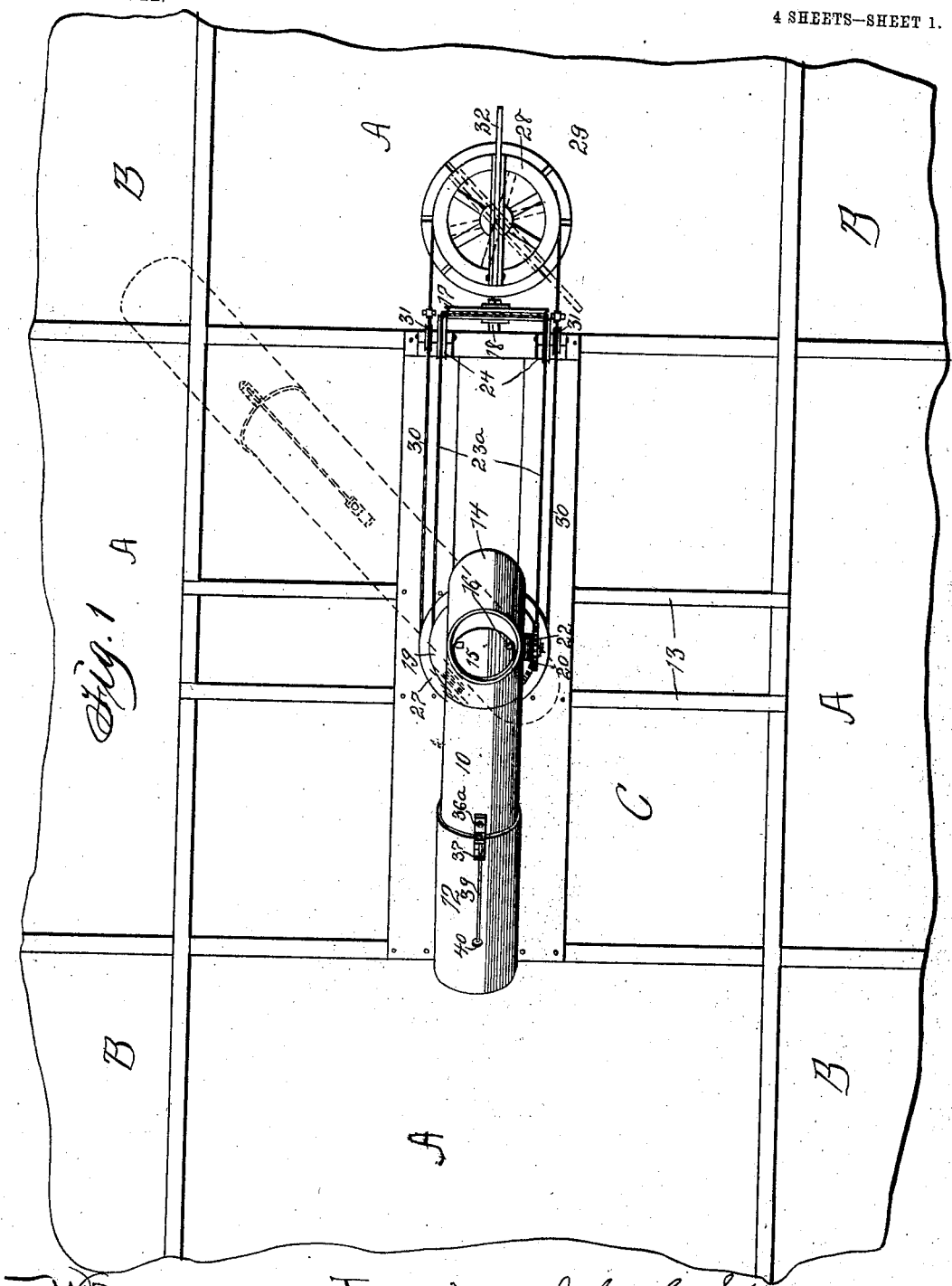
Figure 2:
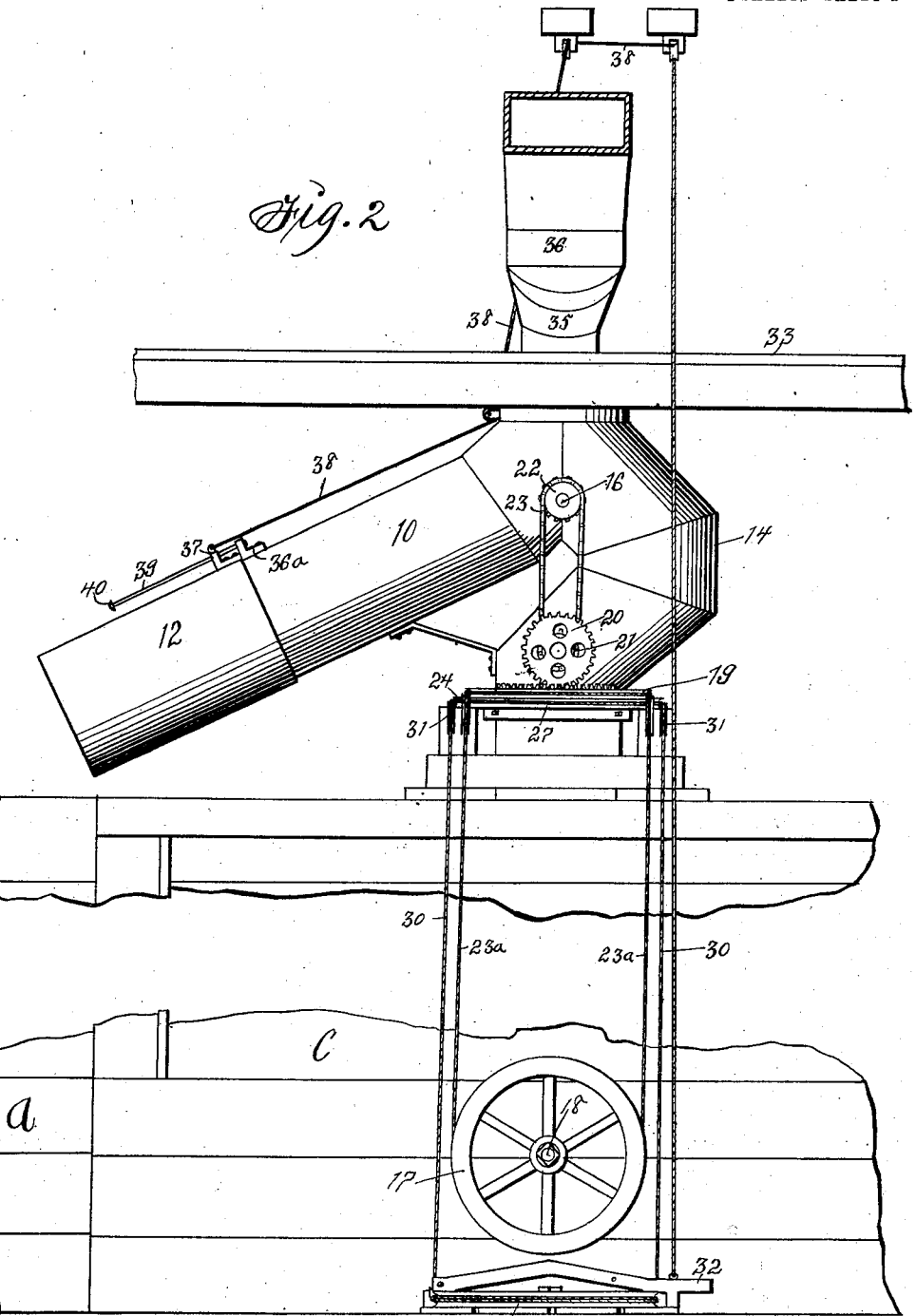
Figure 3:
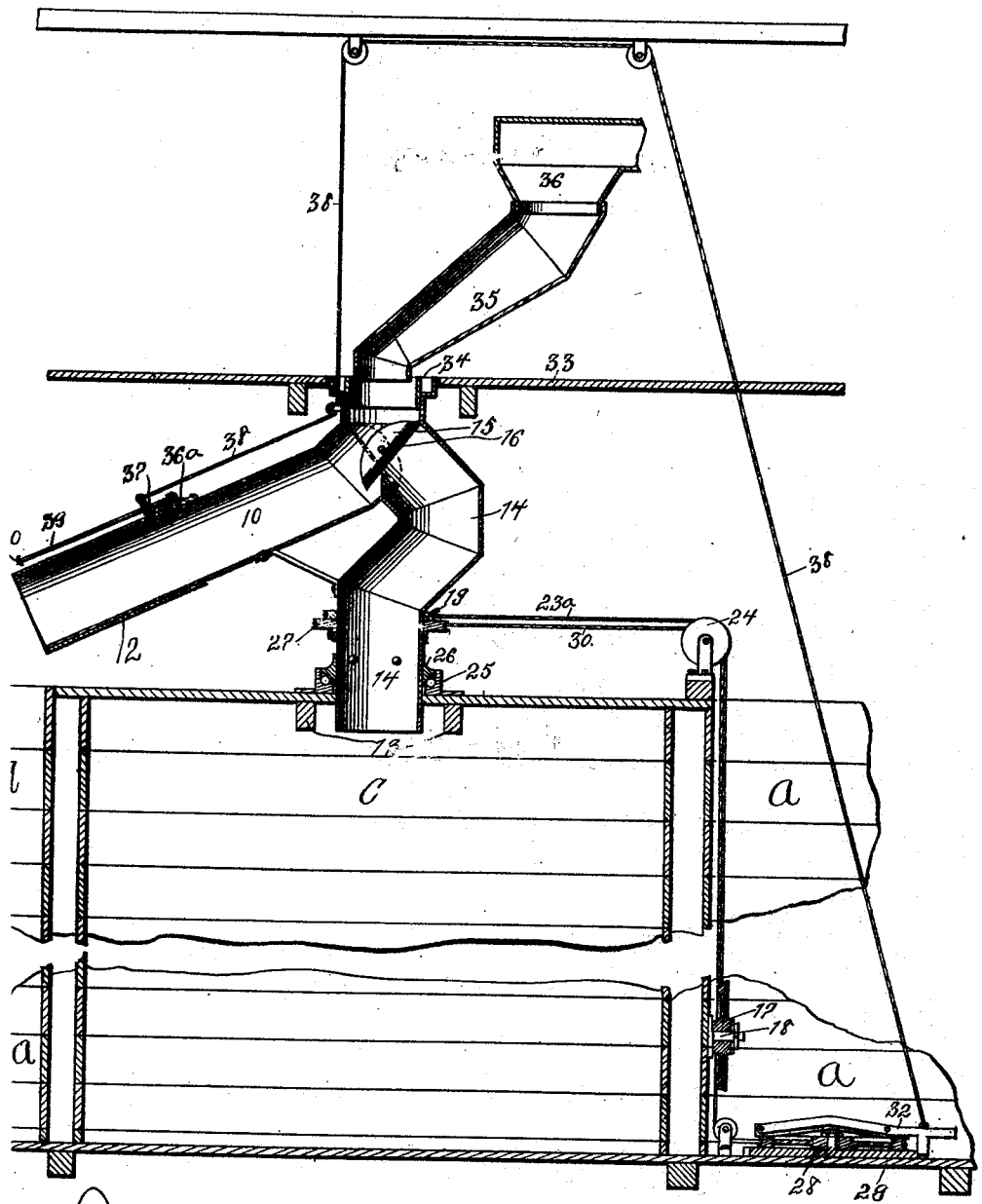

Figure 1 is a top view showing the position of the rotatable grain-distributer relative to a plurality of bins surrounding it and within the radius of the circle in which the distributing-tube revolves. Fig. 2 is a side elevation that shows mechanisms for rotating the tubular distributer, for opening and closing a cut-off in the distributer, and means for lengthening and shortening the distributer. Fig. 3 is a vertical central sectional view of the rotatable tubular distributer in a right-angled position relative to the way it is shown in Fig. 2. Fig. 4 is a vertical sectional view that shows an elevator and conveyer connected with the rotatable distributer and an overflow and signal device connected with the conveyer at the top of the distributer and the lower portion of the elevator-trunk.

The letters A designate four bins within reach of the rotatable tubular distributer 10 when it is contracted in length, and the letters B four bins within reach when a telescopic end 12 of the distributer is extended, as indicated by dotted lines in Fig. 1, from the center of the central bin C, over which cross-pieces 13 are fixed to support the distributing-tube 10. A curved branch 14 is extended from the top of the distributer 10 into the top of the central bin C. A cut-off 15 in the connected open ends of the tube 10 and branch 14 is fixed to a shaft 16, journaled to the tubes in such a manner that it can be adjusted to alternately open and close the tube 10 and branch 14 as required to direct grain to the central bin C or to the bins B and C, at the pleasure of an operator on the ground floor, by simply turning the wheel 17, mounted on an axle 18, fixed to the wall, as shown in Figs. 2 and 3. Connected with a crown-wheel 19, mounted on the supports 13 on top of the central bin C, and a gear-wheel 20, fixed to the upright portion of the tube 14, and a sprocket-wheel 21 on the axle of said gear-wheel, a corresponding sprocket-wheel 22 on the axle 16 of the cut-off 15, a chain 23 on the said sprocket-wheels, and an endless rope 23ª, coiled on the grooved peripheries of the wheels 17 and 19, extended over direction-pulleys 24, as shown in Figs. 1 and 2, will rotate the cut-off axle 16 and cut-off 15 as required to change the direction of grain from the tube 10 to the tube 14, and vice versa, as required to direct the grain to the different bins A, B, and C whenever the wheel 17 is operated for that purpose.

To rotate the distributing-tube 10 as required to deliver grain to the different bins A and B, a turn-table consisting of a ball-bearing flanged ring 25 is fixed on the supports 13, and a mating ring 26 is fixed to the lower end portion of the tube 14, as shown in Figs 2 and 4. A belt-wheel 27 is also fixed to the tube 14, and another belt-wheel 28 is mounted on the floor 29, and the two belt-wheels 27 and 28 are connected by an endless rope 30, coiled around the wheels and extended over direction-pulleys 31 in such a manner that by rotating the wheel 28 the tube 14 and distributing-tube 10 will be rotated to the right or left at the will of the operator. Notches in the wheel 28 admit a handle to lock it and serve as a dial, as shown in Fig. 4. A handle 32 is pivotally connected with the wheel 28 to facilitate rotating the wheel and also for adjusting the end 12 of the tube 10 as required to convey grain to the corner bins B, as indicated by dotted lines in Fig. 1.

The upper ends of the tubes 10 and 14 are jointly and rotatably connected with a floor 33 by means of a tubular bearer 34, fixed to the floor, as shown in Figs. 3 and 4 or in any suitable way, in such a manner that a conveyer-spout 35, connected with the top of an elevator-trunk 36, can convey grain into the rotatable tubes 10 and 14 by force of gravity.

The tube 12 is telescopically connected with the tube 10 by means of an elbow 37, fixed to the tube 12, and a rope 38, extended over direction-pulleys and attached to pivoted handle 32, as shown in Fig. 3, in such a manner that when the handle is lifted the tube-section 12 would slide outward and downward by force of gravity and be directed by a rod 39, fixed to the elbow 36ª on the tube 10 and extended through an aperture in the elbow 37 and restricted in its motion by a knob 40 on the end of the rod 39.

A tube 41 (shown in Fig. 4) is connected with the conveyer-spout 35 and extended down to discharge overflow-grain into an open-topped hopper 42, connected with the elevator-trunk 36, as required to retain the surplus grain into the trunk, and to fall upon a piece of sheet metal 43, attached to the inside of the hopper in such a manner that the sheet metal will give forth sound as required to signal to the operator that the distributing-tubes are overflowing.

Having thus described the purpose of my invention, the construction and function of each operative element and the arrangement and combination of all the parts, the practical operation and utility thereof will be readily understood by persons familiar with the art to which it pertains.

What I claim as new, and desire to secure by Letters Patent, is—

1. In a grain-elevator, a grain-distributing tube rotatably mounted at the top and center of a plurality of bins, an extension telescopically connected with the outer and lower end of the tube, a second tube connected with the upper end of said tube, a cut-off mounted in the two tubes at their junction, and means to move the tube as required to connect it with any one of the bins at the pleasure of the operator, for the purposes stated.

2. In a grain-elevator, a grain-distributing tube rotatably mounted at the top and center of a plurality of bins, an elbow fixed on the top and lower end portion of the tube, an elbow fixed on the top and upper end of the extension and provided with an aperture, a rod, having a knob in its lower end, extended through said aperture and fixed to the elbow on the end of the tube, a rope fixed to the said extension and extended over direction-pulleys, and means to move the tube as required to connect it with any one of the bins at the pleasure of the operator for the purposes stated.

3. In a grain-elevator, a grain-distributing tube rotatably mounted at the top and center of a plurality of bins, an extension telescopically connected with the outer and lower end of the tube, a second tube connected with the upper end of said tube, a cut-off mounted in the two tubes at their junction, a sprocket-wheel on the end of the cut-off shaft, a face-wheel rotatably mounted on the lower portion of said second tube, a gear-wheel mounted on a shaft fixed to said second tube, a sprocket-wheel on said shaft, a chain on the two sprocket-wheels, a belt-wheel on the lower floor of the elevator and an endless rope coiled on the said belt-wheel and extended over direction-pulleys, arranged and combined to operate in the manner set forth for the purposes stated.

4. In a grain-elevator, a rotatable tube mounted over the top and center of a bin, a distributing-tube extending outward and downward from its top, a belt-wheel fixed to the upright portion of the said rotatable tube, a belt-wheel mounted on the lower floor of the elevator and an endless rope on the two belt-wheels and extended over direction-pulleys, arranged and combined to operate in the manner set forth for the purposes stated.

5. In a grain-elevator, a rotatable tube mounted over the top and center of a bin, a distributing-tube extending outward and downward from its top, a belt-wheel mounted on the lower floor of the elevator, notches in the top of the wheel, a handle pivoted to the wheel to enter said notches and an endless rope on the two belt-wheels and extended over direction-pulleys, arranged and combined to operate in the manner set forth for the purposes stated.

6. In a grain-elevator, a rotatable grain-distributing tube, a cut-off in the top of said tube, a conveyer-spout connected with the open top of said tube, a tube for conveying overflow grain connected with the conveyer-spout, a hopper at the lower end of a conveyer-trunk and a sound-signal in the hopper, arranged and combined to operate in the manner set forth for the purposes stated.

JOHN C. SPANGLER.

Witnesses:
S. M. DAUGHENBAUGH,
E. C. CAMPBELL.